United States Patent
Das et al.

(10) Patent No.: US 12,517,955 B2
(45) Date of Patent: Jan. 6, 2026

(54) METHOD AND SYSTEM FOR CLUSTERING DATA SAMPLES

(71) Applicant: L&T TECHNOLOGY SERVICES LIMITED, Chennai (IN)

(72) Inventors: Ishita Das, Kolkata (IN); Madhusudan Singh, Bangalore (IN); Mridul Balaraman, Bangalore (IN); Sukant Debnath, Ahmedabad (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 1 day.

(21) Appl. No.: 18/010,434

(22) PCT Filed: Mar. 18, 2022

(86) PCT No.: PCT/IB2022/052471
§ 371 (c)(1),
(2) Date: Dec. 14, 2022

(87) PCT Pub. No.: WO2022/269370
PCT Pub. Date: Dec. 29, 2022

(65) Prior Publication Data
US 2024/0104144 A1    Mar. 28, 2024

(30) Foreign Application Priority Data
Jun. 25, 2021   (IN) .............. 202141028708

(51) Int. Cl.
*G06F 7/00* (2006.01)
*G06F 16/22* (2019.01)
*G06F 16/906* (2019.01)

(52) U.S. Cl.
CPC ........ *G06F 16/906* (2019.01); *G06F 16/2264* (2019.01)

(58) Field of Classification Search
CPC .. G06F 16/906; G06F 16/2264; G06F 16/285; G06F 16/353; G06F 16/358; G06F 16/45
See application file for complete search history.

(56) References Cited

U.S. PATENT DOCUMENTS 6,092,072 A * 7/2000 Guha .................. G06F 18/232
707/700
6,263,337 B1 * 7/2001 Fayyad .............. G06F 18/2321
(Continued)

OTHER PUBLICATIONS

Scalable Clustering Algorithms with Balancing Constraints; Arindam Banerjee, Department of Computer Science and Engineering, University of Minnesota, Joydeep Ghosh, Department of Electrical and Computer Engineering, College of Engineering, The University of Texas at Austin (Year: 2005).*

*Primary Examiner* — Mohammed R Uddin
(74) *Attorney, Agent, or Firm* — Kendal M. Sheets

(57) ABSTRACT

Method (400) and system for clustering data samples is disclosed. The method (400) may include receiving (402) a plurality of batches, each of the plurality of batches including a plurality of samples, and creating (404) a set of clusters from a first batch of the plurality of batches, using a clustering technique. Each cluster of the set of clusters may include one or more samples. The one or more samples are determined based on variability of the one or more samples and cluster attributes associated with each cluster. The method may further include reconfiguring (406) the set of clusters that includes at least one of: repopulating (400A) the existing set of clusters with samples from remaining batches of the plurality of batches; and adding (400B) a new set of clusters to the existing set of clusters and populating the new set of clusters with samples from the remaining batches.

12 Claims, 5 Drawing Sheets

(56) References Cited

U.S. PATENT DOCUMENTS

| | | | | |
|---|---|---|---|---|
| 10,719,301 | B1* | 7/2020 | Dasgupta | G06F 8/34 |
| 11,416,129 | B2* | 8/2022 | Mueller | G06N 5/022 |
| 2004/0064299 | A1* | 4/2004 | Mark | G01N 21/274 |
| | | | | 703/13 |
| 2008/0114564 | A1* | 5/2008 | Ihara | G06F 16/35 |
| | | | | 702/158 |
| 2011/0145238 | A1* | 6/2011 | Stork | G06F 18/231 |
| | | | | 707/E17.047 |
| 2013/0006988 | A1* | 1/2013 | Li | G06F 18/24137 |
| | | | | 707/E17.046 |
| 2013/0159226 | A1* | 6/2013 | Cheng | G03F 7/70616 |
| | | | | 706/12 |
| 2013/0262465 | A1* | 10/2013 | Galle | G06F 16/00 |
| | | | | 707/E17.089 |
| 2014/0126830 | A1* | 5/2014 | Suganuma | G06V 10/763 |
| | | | | 382/225 |
| 2017/0161606 | A1* | 6/2017 | Duan | G06N 3/08 |
| 2018/0018386 | A1* | 1/2018 | Orlova | G06T 11/206 |
| 2018/0330049 | A1* | 11/2018 | Iavarone | G16B 25/00 |
| 2019/0332963 | A1* | 10/2019 | Wong | G06N 20/00 |
| 2022/0035800 | A1* | 2/2022 | Dym | G06F 9/505 |
| 2022/0067585 | A1* | 3/2022 | Balaraman | G06V 10/40 |
| 2023/0185835 | A1* | 6/2023 | Malviya | G16H 10/20 |
| | | | | 707/728 |

* cited by examiner

METHOD AND SYSTEM FOR CLUSTERING DATA SAMPLES

CROSS-REFERENCE TO RELATED APPLICATIONS

The present application is a filing under 35 U.S.C. 371 as the National Stage of International Application No. PCT/IB2022/052471, filed Mar. 18, 2022, entitled "METHOD AND SYSTEM FOR CLUSTERING DATA SAMPLES," which claims priority to Indian application Ser. No. 202141028708 filed with the Intellectual Property Office of India on Jun. 25, 2021, both of which are incorporated herein by reference in their entirety for all purposes.

TECHNICAL FIELD

This disclosure relates generally to clustering methods, and more particularly relates to method and system for clustering data samples and managing clusters of large datasets.

BACKGROUND

Clustering may be used to find meaningful groups of entities and to differentiate clusters formed for a dataset. However, the clustering of large datasets has become a challenging issue. The increased size of datasets has boosted demand for efficient clustering techniques that satisfy memory use, document processing and execution time requirements because clustering algorithms are expensive in terms of memory and time complexities. Such clustering algorithms that handle large dataset may perform poor in terms of accuracy of clusters formed. Moreover, existing clustering algorithms do not provide with the flexibility to continue clustering a dataset with pre-existing clusters. In such a case, either clusters need to be re-formed from scratch or a clustering model may be used to predict the number of clusters for a new sample.

Accordingly, there is a need for efficient, scalable and accurate method and system for managing volumes of data and to cluster such data easily for data analytics while ensuring the compactness within clusters and separation of individual clusters.

SUMMARY

In accordance with an embodiment, a method of clustering data samples is disclosed. The method may include receiving a plurality of batches, each of the plurality of batches including a plurality of samples, and creating a set of clusters from a first batch of the plurality of batches, using a clustering technique. Each cluster of the set of clusters may include one or more samples. The one or more samples are determined based on variability of the one or more samples and cluster attributes associated with each cluster. The method may further include reconfiguring the set of clusters that includes at least one of: repopulating the existing set of clusters with samples from remaining batches of the plurality of batches; and adding a new set of clusters to the existing set of clusters and populating the new set of clusters with samples from the remaining batches of the plurality of batches.

In another embodiment, a system for clustering data samples is disclosed. The system may include a processor and a memory communicatively coupled to the processor. The memory may be configured to store processor-executable instructions. The processor-executable instructions, on execution, cause the processor to receive a plurality of batches, each of the plurality of batches including a plurality of samples, and create a set of clusters from a first batch of the plurality of batches, using a clustering technique. Each cluster of the set of clusters may include one or more samples. The one or more samples are determined based on variability of the one or more samples and cluster attributes associated with each cluster. The processor-executable instructions, on execution, further cause the processor to reconfigure the set of clusters that includes at least one of: repopulating the existing set of clusters with samples from remaining batches of the plurality of batches; and adding a new set of clusters to the existing set of clusters and populating the new set of clusters with samples from the remaining batches of the plurality of batches.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed system and method for managing clusters of large datasets. A dataset may correspond to a collection of related sets of information that can have individual or multidimensional attributes. The large datasets may include massive volumes of data and loading the same altogether in memory for further processing may not be manageable. The large datasets may include structured data sources and formats. Exemplary aspects of the disclosure provide a distance-based clustering method that may address memory and time complexity, while maintaining the benchmark accuracy of existing clustering algorithms. The disclosed distance-based clustering method may allow to continue clustering new data points when pre-defined clusters are already formed. The disclosed distance-based clustering method may provide flexibility to introduce a sample to a pre-existing cluster or allowing a new sample to form its own cluster. The disclosed distance-based clustering method may facilitate data analysis for applications associated with the large datasets, such as, without limitation, telecommunications, healthcare, bioinformatics, banking, marketing, biology, insurance, city planning, earthquake studies, web document classification and transport services.

Figure 1:
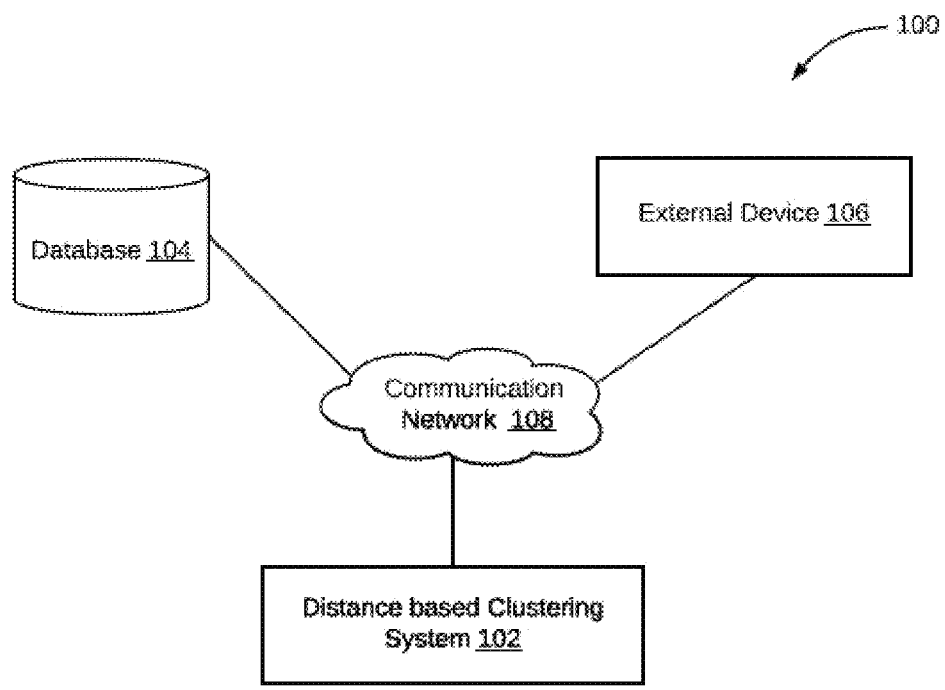
FIG. 1 is a block diagram that illustrates an environment for a distance-based clustering system for managing clusters of large datasets, in accordance with an embodiment of the disclosure.

FIG. 1 is a block diagram that illustrates an environment for a system for managing clusters of large datasets, in accordance with an embodiment of the disclosure. With reference to FIG. 1, there is shown an environment 100. The environment 100 includes a distance-based clustering system 102, a database 104, an external device 106, and a communication network 108. The distance-based clustering system 102 may be communicatively coupled to the database 104 and the external device 106, via the communication network 108.

The distance-based clustering system 102 may include suitable logic, circuitry, interfaces, and/or code that may be configured to cluster new data points after a pre-defined clusters are already formed. In accordance with an embodiment, the distance-based clustering system 102 may be configured to provide flexibility to introduce a sample to a pre-existing cluster or allowing a new sample to form its own cluster. Therefore, the distance-based clustering system 102 may automatically group similar items to discover hidden similarities and key concepts while combining a large amount of data into a few clusters to develop meaningful insights. This enables users (not shown in FIG. 1) to comprehend a large amount of data corresponding to the large dataset.

In accordance with an embodiment, various distance metrics may be used by the distance-based clustering system 102 for creating multi-dimensional matrices. The various distance metrics may include, without limitation, Euclidean distance, Manhattan distance, Minkowski distance, and Jaccard distance.

By way of example, the distance-based clustering system 102 may be implemented as a plurality of distributed cloud-based resources by use of several technologies that are well known to those skilled in the art. Other examples of implementation of the distance-based clustering system 102 may include, but are not limited to, a web/cloud server, an application server, a media server, and a Consumer Electronic (CE) device.

The database 104 may include suitable logic, circuitry, interfaces, and/or code that may be configured to capture datasets that may be generated by various sources such as, but not limited to, meteorological departments, telecommunications systems, and sensors. The data size may vary from terabyte to petabyte and the actual novelty of the idea will be visible when the size of data increases, but the algorithm also works on smaller datasets For example, the database 104 may also store metadata along with the dataset and may be accessed via the communication network 108. While the example of FIG. 1 includes a single database (the database 104) as part of the distance-based clustering system 102, it should be understood that the distance-based clustering system 102 may also be located elsewhere in the environment 100. For example, a discrete storage device may be coupled with the distance-based clustering system 102, via a local connection or over the communication network 108.

The external device 106 may include suitable logic, circuitry, interfaces, and/or code that may be configured to render display of meaningful insights of the large dataset from the distance-based clustering system 102. This enables users associated with the external device 106 to comprehend a large amount of data corresponding to the large dataset. The functionalities of the external device 106 may be implemented in portable devices, such as a high-speed computing device, and/or non-portable devices, such as a server. Examples of the external device 106 may include, but are not limited to, a smart phone, a mobile device, and a laptop.

The communication network 108 may include a communication medium through which the distance-based clustering system 102, the database 104, and the external device 106 may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 108, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 2:
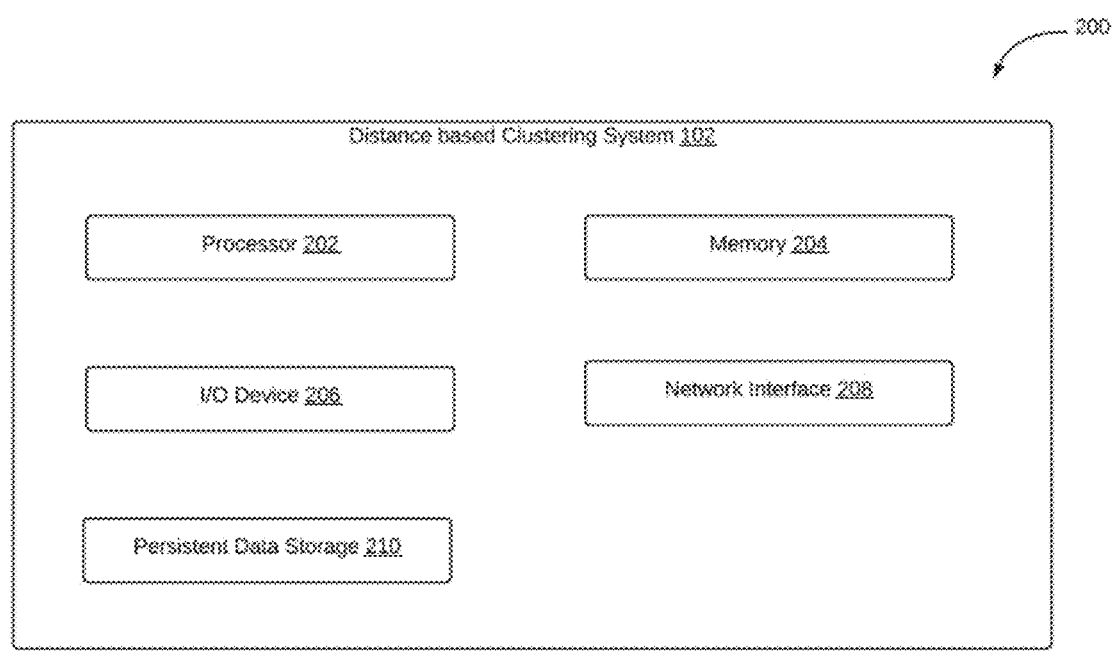
FIG. 2 is a block diagram that illustrates an exemplary distance-based clustering system for managing clusters of large datasets, in accordance with an embodiment of the disclosure.

FIG. 2 is a block diagram of an exemplary distance-based clustering system 102 for managing clusters of large datasets, in accordance with an embodiment of the disclosure. FIG. 2 is explained in conjunction with elements from FIG. 1.

With reference to FIG. 2, there is shown a block diagram 200 of the distance-based clustering system 102. The distance-based clustering system 102 may include a processor 202, a memory 204, an input/output (I/O) device 206, a network interface 208, and a persistent data storage 210.

The processor 202 may be communicatively coupled to the memory 204, the I/O device 206, the network interface 208, and the persistent data storage 210. In one or more embodiments, the distance-based clustering system 102 may also include a provision/functionality to capture dataset via one or more databases, for example, the database 104.

The processor 202 may include suitable logic, circuitry, interfaces, and/or code that may be configured to create clusters and update with each batch of the large dataset. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof.

The memory 204 may include suitable logic, circuitry, and/or interfaces that may be configured to store instructions executable by the processor 202. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user and the distance-based clustering system 102. The user may include a data analyst who operates the distance-based clustering system 102. The I/O device 206 may include various input and output devices, which may be configured to communicate with different operational components of the distance-based clustering system 102. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to facilitate different components of the distance-based clustering system 102 to communicate with other devices, such as the external device 106, in the environment 100, via the communication network 108. The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The persistent data storage 210 may include suitable logic, circuitry, and/or interfaces that may be configured to store databases, program instructions executable by the processor 202, and operating systems. The persistent data storage 212 may include a computer-readable storage media for carrying or having computer-executable instructions or data structures stored thereon. Such computer-readable storage media may include any available media that may be accessed by a general-purpose or special-purpose computer, such as the processor 202.

By way of example, and not limitation, such computer-readable storage media may include tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 202 to perform a certain operation or a set of operations associated with the distance-based clustering system 102. The functions or operations executed by the distance-based clustering system 102, as described in FIG. 1, may be performed by the processor 202. In accordance with an embodiment, additionally, or alternatively, the operations of the processor 202 are performed by various modules.

Figure 3A:
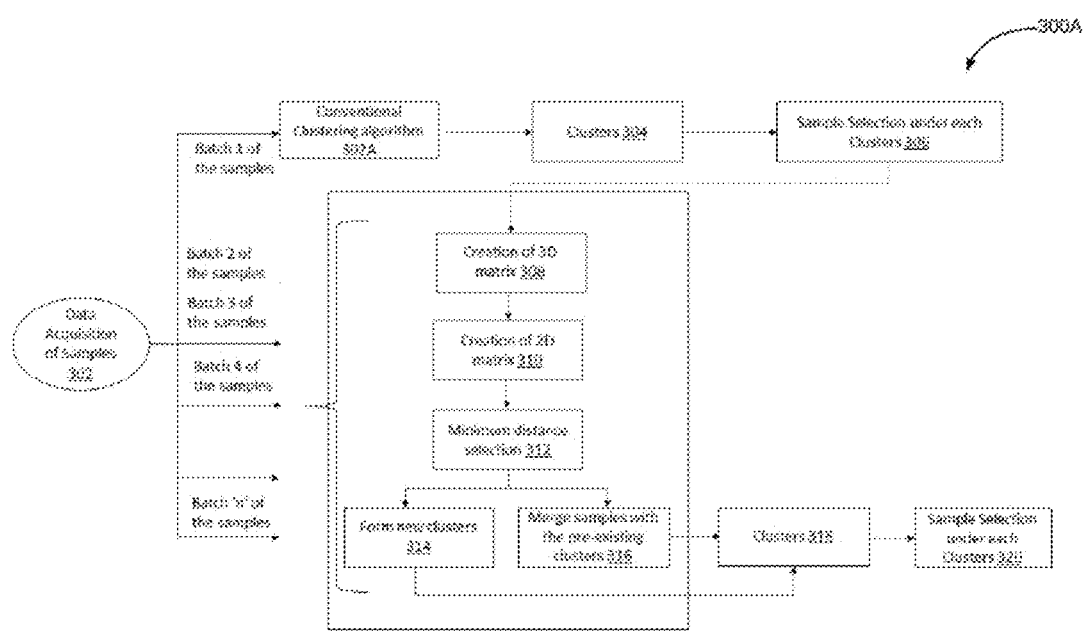
FIG. 3A-3B collectively illustrate exemplary operations for distance-based clustering system for managing clusters of large datasets, in accordance with an embodiment of the disclosure.
Figure 3B:
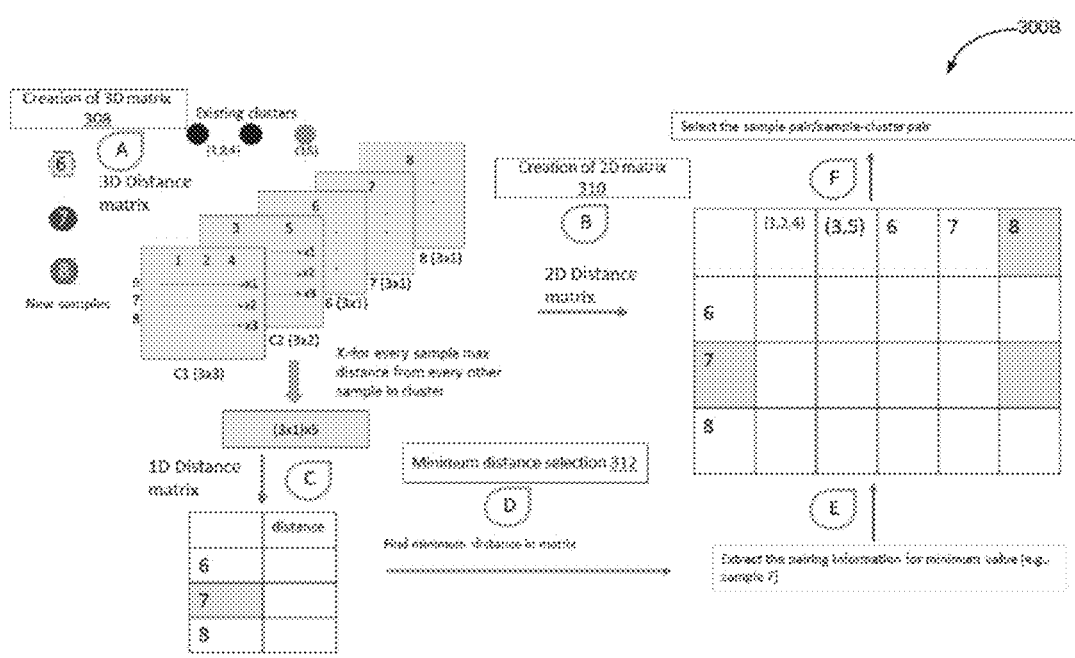

FIG. 3A-3B collectively illustrate exemplary operations for distance-based clustering system 102 for managing large datasets, in accordance with an embodiment of the disclosure. FIG. 3A-3B are explained in conjunction with elements from FIG. 1 to FIG. 2.

With reference to FIG. 3A, there is shown a diagram 300A that illustrates a set of operations for the distance-based clustering system 102, as described herein.

At 302, a data acquisition may be performed. In the data acquisition operation, the processor 202 may acquire samples as input for the distance-based clustering system 102 using a conventional clustering algorithm 302A. The samples may be further processed in a batch wise manner. By way of an example, a first batch goes into the conventional clustering algorithm and consecutive batches (such as, a second batch, a third batch and so forth) are clustered, as described herein, which considers output of previous clustering algorithm.

In accordance with an embodiment, the conventional clustering algorithm may be used to cluster the first batch of large dataset. The number of clusters to be formed may depend on a threshold value provided to a cluster-based model. In accordance with an embodiment, the threshold value may be generated based on an empirical probability density function.

At 304, generation of clusters may be performed. In accordance with an embodiment, the processor 202 may be configured to generate a plurality of clusters from the first batch of large dataset.

At 306, sample selection under each cluster may be performed. In accordance with an embodiment, the processor 202 of the distance-based clustering system 102 may be configured to select adequate samples from each cluster generated in step 304. The selected samples may represent the clusters in terms of variability and cluster properties. The selection of the samples may facilitate in reduction of a total number of the samples. Consequently, the distance-based clustering system 102 may limit the memory and time complexity for large datasets.

At 308, creation of three-dimensional (3D) matrix may be performed. In accordance with an embodiment, the processor 202 may be configured to calculate a distance of each sample in a new batch with themselves and with each sample in pre-existing clusters.

At 310, creation of two-dimensional (2D) matrix may be performed. In accordance with an embodiment, the processor 202 may be configured to determine largest distance of each sample with every other sample in each of the pre-existing clusters, thereby reducing the 3-dimensional matrix to a 2-dimensional matrix.

At 312, selection of minimum distance may be performed. In accordance with an embodiment, the processor 202 may be configured to select the smallest distance in the 2D matrix created in step 310. The entities having the smallest distance value may correspond to the closest element. The selection of the entity for clustering may be a recurring step for a given batch and the recurring step may continue till the smallest distance value is lower than a predefined threshold value. The operations 308-312 have been explained in detail in conjunction with FIG. 3B.

At 314, creation of new clusters may be performed. In accordance with an embodiment, the processor 202 may be configured to create new clusters depending on whether the smallest distance is between two samples in the new batch. The sample-pair may be placed into one of the pre-existing clusters based on minimum distance calculation in consecutive iterations.

At 316, merging of samples with pre-existing clusters may be performed. In accordance with an embodiment, the processor 202 may be configured to merge the samples with the pre-existing clusters based on maximizing the inter-cluster distance and minimizing the intra-cluster distance. By way of an example, when the smallest distance is between a sample in new batch with a cluster of a previous batch, the sample may be placed in the pre-existing cluster. Simultaneously, the distance of the cluster with respect to other samples in the new batch may be updated.

At 318, creation of new clusters or absorption of samples in pre-existing clusters may be performed. In accordance with an embodiment, the processor 202 may be configured to create new clusters for new samples or be absorbed in pre-existing clusters, at the end of each batch. For each sample in the batch, operations 312-316 get repeated.

At 320, sample selection under each cluster may be performed. In accordance with an embodiment, the processor 202 may be configured to select sample under each cluster. As clusters are created and updated with each batch, the sample selection approach from clusters as described in step 306 helps in reducing the total samples in a cluster, thereby making the dataset a lot scalable.

With reference to FIG. 3B, a block diagram 300B with operations 308-312 for dimensionality reduction of datasets is illustrated in detail, in accordance with an embodiment of the disclosure. FIG. 3B is explained in conjunction with FIG. 1 to FIG. 3A

In accordance with an embodiment, the processor 202 of the distance-based clustering system 102 may be configured to create multi-dimensional matrix (such as, the 3D matrix and the 2D matrix) for generating distance of each sample in the new batch with themselves and with each sample in the pre-existing clusters. Further, the processor 202 of the distance-based clustering system 102 may be configured to reduce dimension of the multi-dimensional matrix (such as, reducing 3D matrix to 2D matrix), while keeping track of the sample pairing information simultaneously.

For creation of 3D Matrix when new samples may be introduced in a clustering plane, the processor 202 may be configured to calculate the distance of new samples with every other sample in each cluster. Additionally, the processor 202 may be configured to calculate the distance of every sample in the new batch within themselves.

For creation of 3D Matrix, the processor 202 may be configured to determine the largest distance of each sample with every other sample in a cluster, thereby reducing the 3D matrix to a 2D matrix. This utilizes the concept of furthest neighbor linkage, which is largest distance over all possible pairs.

Additionally, or optionally, 1D matrix may be created from 2D matrix. In accordance with an embodiment, for creation of 1D Matrix, the processor 202 may be configured to reduce the 2D matrix to a single dimension by taking the smallest distance from each row and keeping the sample-pairing information stored in the 2D matrix. Thus, the similarity of a sample with another cluster is the similarity of two furthest point in those two groups.

In accordance with an embodiment, the processor 202 may be configured to determine minimum distance in the matrix, thereby choosing the minimum value in the single dimension distance matrix. This is equivalent to choosing a pair which are closest entities in the clustering plane.

In accordance with an embodiment, the processor 202 may be configured to extract the pairing information for minimum value. The extraction of the pair information for the sample from the 2D matrix may be based on the index of minimum value selected in previous step.

In accordance with an embodiment, the processor 202 may be configured to select the sample pair/sample cluster pair. At this step, the information may be known for where each new sample will go, whether a new sample will merge in existing cluster or form a cluster of its own by pairing with a new sample.

Figure 4:
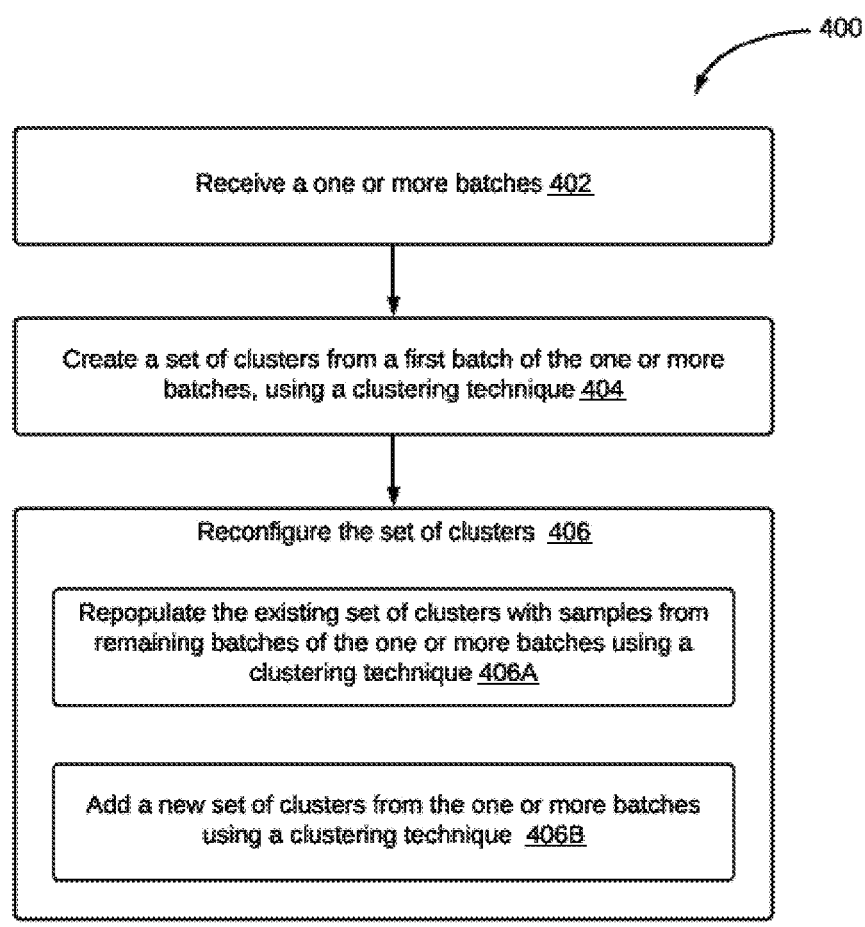
FIG. 4 is a flowchart that illustrates an exemplary method for managing clusters of large datasets, in accordance with an embodiment of the disclosure.

FIG. 4 is a flowchart that illustrates an exemplary method 400 of clustering data samples, in accordance with an embodiment of the disclosure.

At step 402, a plurality of batches may be received. Each of the plurality of batches may include a plurality of samples.

At step 404, a set of clusters may be created from a first batch of the plurality of batches, using a clustering technique. Each cluster of the set of clusters may include one or more samples. The one or more samples are determined based on variability of the one or more samples and cluster attributes associated with each cluster of the set of clusters. The set of clusters are created based on a second predetermined threshold. The second predetermined threshold value may be determined based on an empirical probability density function.

At step 406, the set of clusters may be reconfigured. The reconfiguring may include at least one of: repopulating 406A the existing set of clusters with samples from remaining batches of the plurality of batches; and adding 406B a new set of clusters to the existing set of clusters and populating the new set of clusters with samples from the remaining batches of the plurality of batches. Reconfiguring the set of clusters may further include computing a distance for each sample of the remaining batches with remaining samples of the remaining batches and with each sample of the existing set of clusters; determining a maximum distance value for each sample of the remaining batches with samples in the existing set of clusters; iteratively selecting one or more close samples from the samples of the remaining batches and existing clusters, wherein selecting the one or more close samples is based on a smallest distance value from amongst the maximum distance values; and reconfiguring the set of clusters based on the selected one or more close samples. Selecting one or more close samples may include iteratively comparing the smallest distance value with a first predetermined threshold value, and selecting a close sample having an associated smallest distance value less than the first predetermined threshold.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method for clustering data samples, the method comprising:
   receiving, by the processor, one or more batches of dataset each comprising a plurality of data samples;
   clustering, by the processor, data samples of the first batch of the one or more batches of dataset in one of a first set of clusters based on distance-based clustering;
   clustering, by the processor, data samples of each of subsequent batches, subsequent to the first batch, from the one or more batches of dataset;
   reconfiguring, by the processor, the first set of clusters, wherein the reconfiguring comprises:
      repopulating, by the processor, the first set of clusters with data samples from a corresponding subsequent batch from the one or more batches; and
      adding, by the processor, a second set of clusters to the first set of clusters and populating the second set of clusters with the data samples from the corresponding subsequent batch from the one or more batches; and
   iteratively selecting, by the processor, one or more close samples from the data samples of the corresponding subsequent batch and the first set of clusters, based on a smallest distance value from amongst maximum distance values, wherein the first set of clusters are reconfigured based on the iteratively selected one or more samples, wherein selecting the one or more close samples comprises:
   iteratively comparing, by the processor, the smallest distance value with a first predetermined threshold value; and
   selecting, by the processor, a close sample including an associated smallest distance value less than the first predetermined threshold; and
      wherein the data samples of each of the subsequent batches are clustered based on creation of multi-dimensional matrix based on a distance of each of the data samples of the subsequent batch and the data samples of the first set of clusters, wherein the multi-dimensional matrix comprises: a three-dimensional (3D) matrix and a two-dimensional (2D) matrix.

2. The method of claim 1, wherein reconfiguring the first set of clusters comprises:
   computing, by the processor, a distance for each data sample of the corresponding subsequent batch each of the data samples of the corresponding subsequent batch and with each of the clustered data samples of the first set of clusters; and
   determining, by the processor, a maximum distance value for each of the data samples of the corresponding subsequent batch with the data samples in the first set of clusters.

3. The method of claim 1, wherein the first set of clusters are created based on a second predetermined threshold value.

4. A distance-based clustering system for clustering data samples, the system comprising:
   a memory;
   an input/output device;
   a network interface;
   a persistent data storage; and
   a computer processor coupled to the memory, the I/O device, the network interface, and the persistent data storage wherein the computer processor is configured to:
      receive one or more batches of dataset, wherein each of the one or more batches of dataset comprises a plurality of data samples;
      cluster data samples of the first batch of the one or more batches of data in one of a first set of clusters based on distance-based clustering;
      cluster data samples of each of subsequent batches, subsequent to the first batch, from the one or more batches of dataset based on:
      reconfiguration to the first set of clusters, wherein the reconfiguration comprises:
         repopulation of the first set of clusters with data samples from a corresponding subsequent batch from the one or more batches; and
      addition of a second set of clusters to the first set of clusters and population of the second set of clusters with the data samples from the corresponding subsequent batch from the one or more batches; and
      iteratively select one or more close samples from the data samples of the corresponding subsequent batch and the first set of clusters, based on a smallest distance value from amongst maximum distance values, wherein the first set of clusters are reconfigured based on the iteratively selected one or more samples, wherein selecting the one or more close samples comprises:

iteratively comparing the smallest distance value with a first predetermined threshold value; and selecting a close sample including an associated smallest distance value less than the first predetermined threshold; and wherein the data samples of each of the subsequent batches are clustered based on creation of multi-dimensional matrix based on a distance of each of the data samples of the subsequent batch and the data samples of the first set of clusters, wherein the multi-dimensional matrix comprises: a three-dimensional (3D) matrix and a two-dimensional (2D) matrix.

5. The distance-based clustering system of claim 4, wherein for the reconfiguration of the first set of clusters the computer processor is configured to:

compute a distance for each data sample of the corresponding subsequent batch with each of the data samples of the remaining batches and with each sample of the first set of clusters; and determine a maximum distance for each of the data samples of the corresponding subsequent batch with the data samples in the first set of clusters.

6. The distance-based clustering system of claim 4, wherein the data samples of each of the subsequent batches are clustered based on reduction of a multi-dimensional matrix to a single dimension matrix, based on a smallest distance from each row of the multi-dimensional matrix and retaining sample-pairing information stored in the 2D matrix.

7. The distance-based clustering system of claim 6, wherein the processor is configured to reduce the 3-dimensional matrix to a 2-dimensional matrix based on determination of a largest distance amongst each of the data samples of each cluster from the first set of clusters.

8. The distance-based clustering system of claim 7, wherein the distance is determined as one of: Euclidean distance, Manhattan distance, Minkowski distance, and Jaccard distance.

9. The non-transitory computer-readable medium of claim 8, wherein the processor is configured to reconfiguring the first set of clusters by:

computing a distance for each data sample of the corresponding subsequent batch each of the data samples of the corresponding subsequent batch and with each of the clustered data samples of the first set of clusters; and determining a maximum distance value for each of the data samples of the corresponding subsequent batch with the data samples in the first set of clusters.

10. The non-transitory computer-readable medium of claim 8, wherein the first set of clusters are created based on a second predetermined threshold value.

11. A non-transitory computer-readable medium storing computer-executable instructions for examining relevancy of documents, the stored instruction, when executed by a processor, cause the processor to perform operations comprising:

receiving one or more batches of dataset each comprising a plurality of data samples;

clustering data samples of the first batch of the one or more batches of dataset in one of a first set of clusters based on distance-based clustering;

clustering data samples of each of subsequent batches, subsequent to the first batch, from the one or more batches of data by:

reconfiguring the first set of clusters, wherein the reconfiguring comprises:

repopulating the first set of clusters with data samples from a corresponding subsequent batch from the one or more batches; and adding a second set of clusters to the first set of clusters and populating the second set of clusters with the data samples from the corresponding subsequent batch from the one or more batches; and iteratively selecting one or more close samples from the data samples of the corresponding subsequent batch and the first set of clusters, based on a smallest distance value from amongst maximum distance values, wherein the first set of clusters are reconfigured based on the iteratively selected one or more samples, wherein selecting the one or more close samples comprises:

iteratively comparing the smallest distance value with a first predetermined threshold value; and selecting a close sample including an associated smallest distance value less than the first predetermined threshold; and wherein the data samples of each of the subsequent batches are clustered based on creation of multi-dimensional matrix based on a distance of each of the data samples of the subsequent batch and the data samples of the first set of clusters, wherein the multi-dimensional matrix comprises: a three-dimensional (3D) matrix and a two-dimensional (2D) matrix.

12. The non-transitory computer-readable medium of claim 11, wherein the distance is determined as one of: Euclidean distance, Manhattan distance, Minkowski distance, and Jaccard distance.

* * * * *